United States Patent

[11] 3,574,450

| [72] | Inventors | Carroll T. White<br>3321 Poe St., San Diego, Calif. 92106;<br>Melvin R. Harter, 809 Courtland St.,<br>Greensboro, N.C. 27401 |
|---|---|---|
| [21] | Appl. No. | 825,596 |
| [22] | Filed | May 19, 1969 |
| [45] | Patented | Apr. 13, 1971 |

[54] METHOD AND APPARATUS FOR DETERMINING THE EFFECTIVENESS OF SPATIAL VISION
13 Claims, 17 Drawing Figs.

[52] U.S. Cl.................................................. 351/17,
128/2.1, 351/30, 351/31, 351/32, 351/34, 351/36, 351/39
[51] Int. Cl.......................................................... A61b 3/02
[50] Field of Search.......................................... 351/1, 17, 30, 31, 32, 34, 36, 39, 24; 128/2.16, 2.1

[56] References Cited
UNITED STATES PATENTS

| 1,647,017 | 10/1927 | Reaves ........................ | 351/34X |
| 2,149,897 | 3/1939 | Ogle ............................. | 351/17X |
| 2,860,627 | 11/1958 | Harden et al. ................ | 128/2.16 |
| 3,172,404 | 3/1965 | Copenhaver et al.......... | 351/24UX |
| 3,421,498 | 1/1969 | Gans ............................. | 351/24X |

OTHER REFERENCES

Davis, John, M. D., " A Sensitive System for the Measurement of Brain Responses in the Intact Human," IRE Transactions on Medical Electronics, July 1958, pp 29— 34 (128-2.16)

Primary Examiner—David Schonberg
Assistant Examiner—Paul A. Sacher
Attorneys—J. C. Warfield, Jr., George J. Rubens and John W. McLaren ABSTRACT: A method and apparatus for testing the spatial vision of a subject by obtaining averaged evoked cortical responses produced by various patterned stimuli; and by obtaining such responses produced by a subject observing a given pattern through a graded series of ophthalmic lenses. The amplitude of certain components of the evoked cortical response, occurring at specific times following the brief illumination of such patterns, vary directly with the degree of clarity of the perceived images produced by these patterns. The degree of refractive error, and other aspects of a subject's visual characteristics, can thus be determined by finding the conditions that produce the maximum amplitudes of those specific components of the evoked response.

PATENTED APR 13 1971
SHEET 1 OF 4
3,574,450
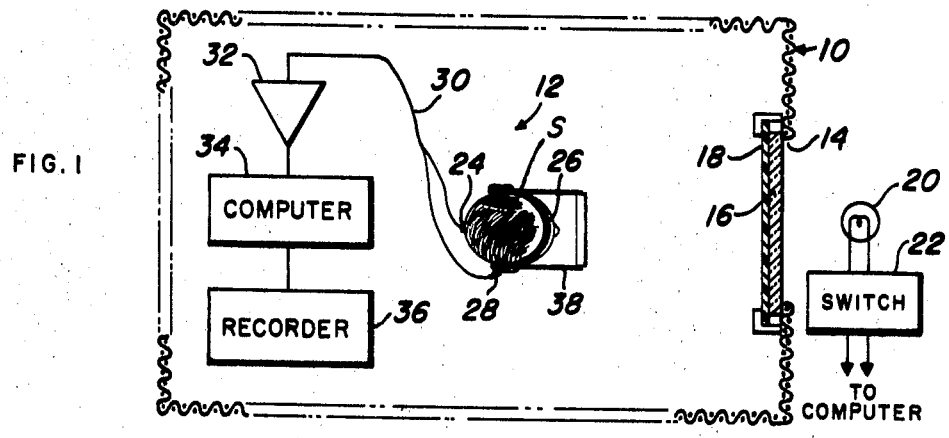
FIG. 1
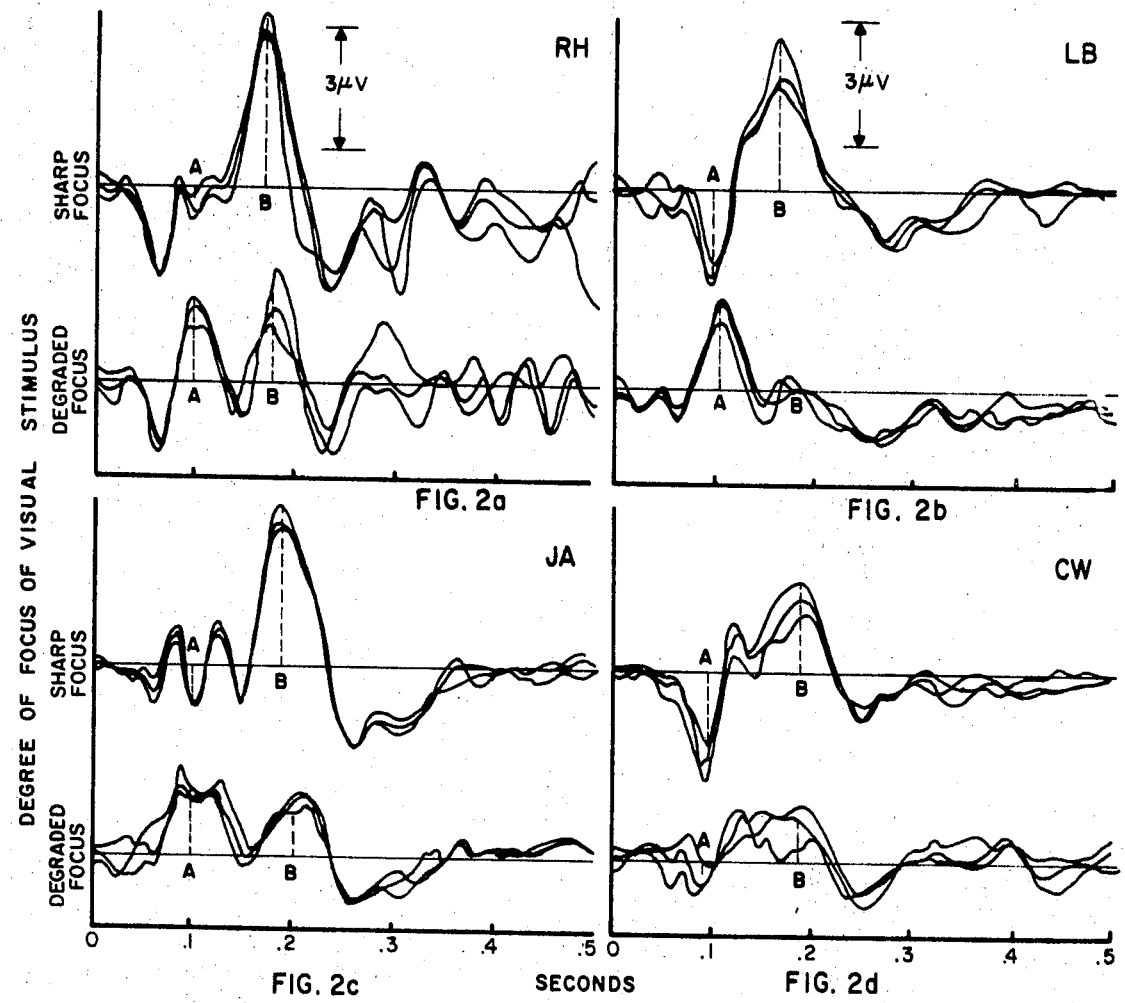
FIG. 2a
FIG. 2b
FIG. 2c
FIG. 2d
INVENTORS
CARROLL T. WHITE
MELVIN R. HARTER
BY
George J. Rubens
ATTORNEYS

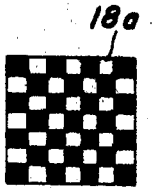
FIG. 3a
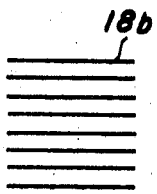
FIG. 3b
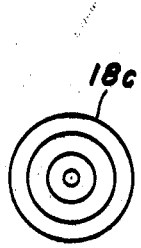
FIG. 3c
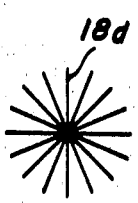
FIG. 3d
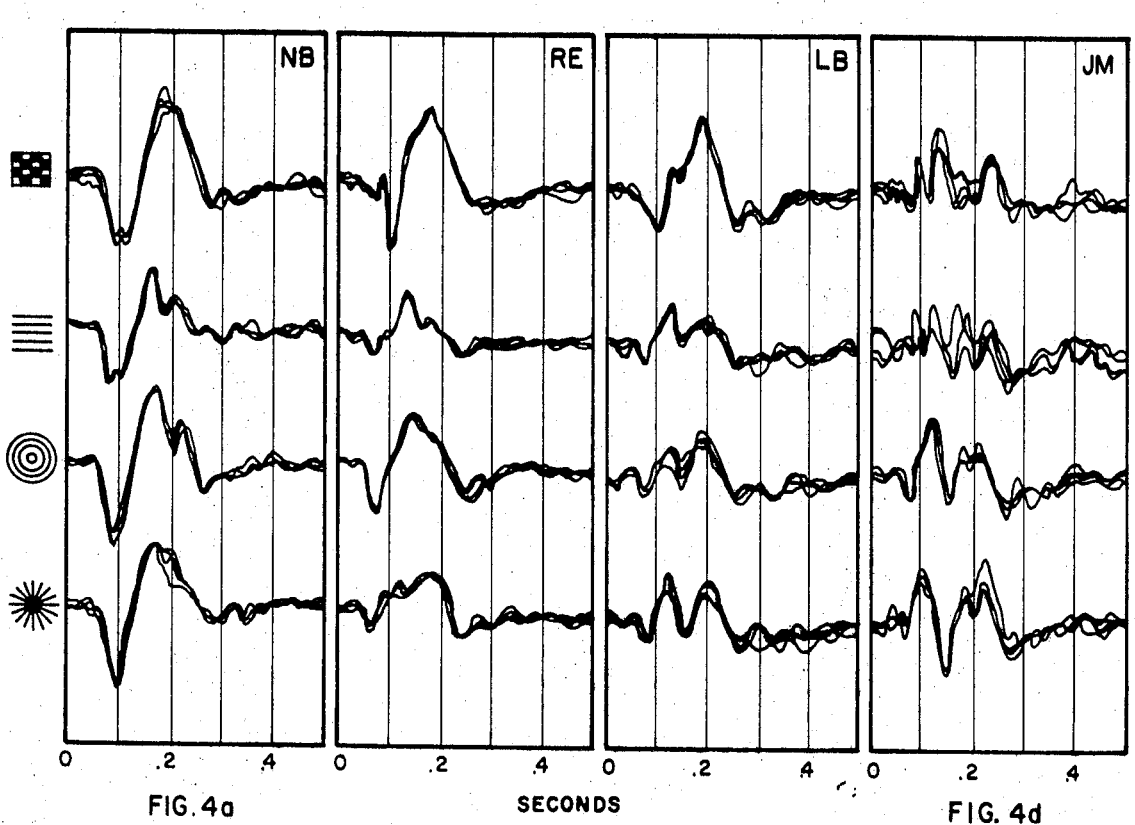

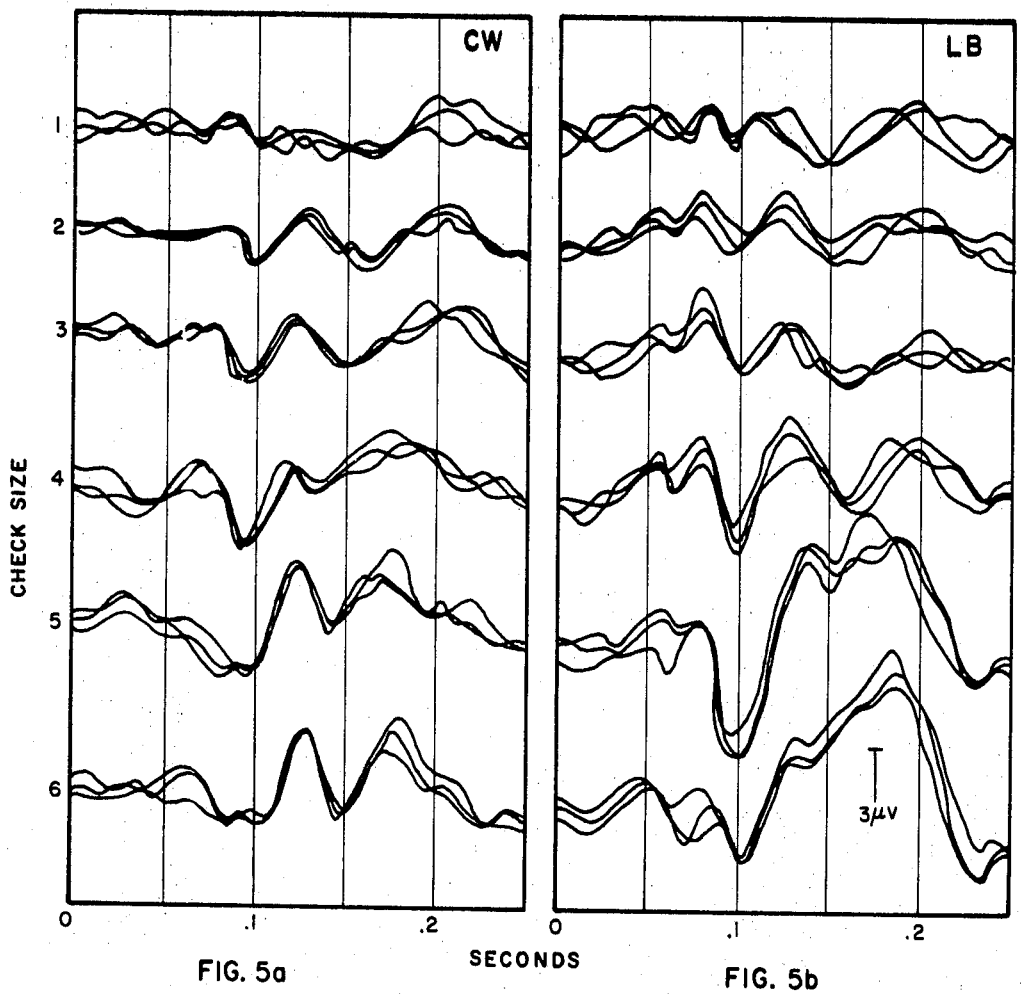

METHOD AND APPARATUS FOR DETERMINING THE EFFECTIVENESS OF SPATIAL VISION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to an optometric method and apparatus, and more particularly to such a method and apparatus wherein the testing is accomplished objectively by utilizing the cortical evoked responses of the subject to indicate the best visual acuity.

The long accepted procedure in optometry for determining the spatial vision of a subject as to refractive correction is to place an eye chart or any reading matter before the subject and while changing the opthalmic lenses in a lens holder, elicit a subjective comment from the subject as to when the reading material appeared to be most clear. For purposes of checking the astigmatic correction, it is also a common practice to place a grating of black and white lines before the subject, and while the grating is rotated the subject is required to indicate whether the grating appeared clearer in any of the various angular positions. Thus, in both procedures the determination of spatial vision relies principally upon a subjective determination which is at times difficult even for adults who have the ability to apprehend and communicate. Frequently, portions of the testing procedures must be repeated until any doubts are resolved by the subject as to the condition of best vision. For children and those subjects unable to apprehend and/or communicate, these procedures are of little or no use. Because of these subjective procedures detection of vision defects in children, such as amblyopia, commonly referred to as "lazy eyes" can not be ascertained easily early in childhood.

Although the general effects of a focused as compared to a defocused image on visually evoked cortical potentials have been investigated directly or indirectly by other investigators, it was not previously discovered that a pronounced difference in the recorded electrical energy occurs at a fairly precise predetermined elapsed time after stimulation when the image of the stimulus is most sharply focused to the subject.

SUMMARY OF THE INVENTION

By employing the method and apparatus of this invention, the subjective requirement of communication in the long accepted optometric procedures of correction spatial vision is eliminated and instead, an objective determination using brainwave recordings is relied upon. Use of an objective determination improves the quality of the test, and enables the testing of subjects that heretofore were not feasible to test.

An important feature of the present invention resides in the discovery that the sharpness of focus of a stimulus viewed by a subject will cause a distinctive change in the recorded brainwaves of the viewer at a predetermined elapsed time after the stimulation, which change is directly proportional to the degree of sharpness of the stimulus. The change in electrical energy created by the brain in reacting to a stimulus is called evoked response or evoked potential.

To best achieve this novel result, for certain tests, the stimulus should have clear, sharp edges or contour because the evoked response is most sensitive to such a pattern and will larger in magnitude. The best results for correcting nearsightedness and farsightedness have been achieved by a stimulus configured in a closed pattern, i.e., a checkerboard pattern. A grating stimulus of black and white lines are used in the test for astigmatism.

The subject may be seated in a darkened environment, preferably electrically shielded. A pair of electrodes are supported on the viewer's head at an appropriate position and electrically connected to an average response-type computer which is in turn connected to a recorder. The stimulus is flashed before the subject at short intervals, such as by a strobe light which is used to trigger the operation of the computer. In the testing of near and farsightedness, by means of a lens holder and a graded series of opthalmic lens having different diopter values (both positive and negative), the sharpness of focus is varied, that is, the image of the stimulus is made cleared or more diffused, and the evoked response for each stimulation is translated to the computer. A number of responses are taken for each different setting tested which responses are summed and averaged by the computer. A similar procedure is followed for the astigmatism test except that a stimulus in the form of a grating of black and white lines is rotated before the subject to a number of angular positions and the evoked response to each angular position is summed and averaged.

Another important corollary feature of the novel method resides in the unique occurrence of two significant maximum values or components in each evoked response at predetermined elapsed times after stimulation which serve as key reference points in evaluating the condition of best vision. One reference component has a maximum negative magnitude occurring at an elapsed time of about 100 msec. ± 10 msec., and the second reference component has a maximum positive magnitude occurring at about 180 msec. ± 10 msec. The location of these two reference components will vary somewhat with different subjects and different stimuli, but as they can be ascertained readily a precise value is not required.

The maximum evoked potential at the above named reference positions will indicate the diopter setting which provides the sharpest visual image so far as the refraction correction test, while a similar condition will be evident in the astigmatism test.

STATEMENT OF THE OBJECTS OF THE INVENTION

An important object of this invention is to provide a method and apparatus for determining the refractive error and quality of vision that eliminates the need for any conscious cooperation by the subject through apprehension, judgment or communication.

A corollary object is to provide an improved method and apparatus which will enable the determination of refractive error and quality of vision of subjects who heretofore were not capable of being tested, such as babies and persons who are mentally incapacitated.

Another important object is to provide such a method and apparatus which improves the quality of testing and can be performed quicker.

Other objects, advantages and novel features of the invention will become apparent from the following detailed description of the invention when considered in conjunction with the accompanying drawings wherein:

FIG. 1 is a top schematic view of the invention apparatus by which is carried out the method for determining the effectiveness of spatial vision of a subject seated or lying in an enclosure;

FIG. 2 shows evoked cortical potential patterns for two conditions of focus of the stimuli; i.e., sharp focus and degraded focus, obtained from four different subjects in FIGS. 2a, 2b, 2c and 2d;

FIG. 3 is a front view of four different configurations of stimulus patterns in FIGS. 3a, 3b, 3c and 3d respectively;

FIG. 4 is evoked cortical potential curves for the different stimuli shown in FIG. 3 taken from four different subjects in FIGS. 4a, 4b, 4c and 4d respectively;

FIG. 5 shows evoked cortical potential patterns produced by various sized checkerboard configured stimuli for two subjects in FIGS. 5a, and 5b respectively;

Figure 6:
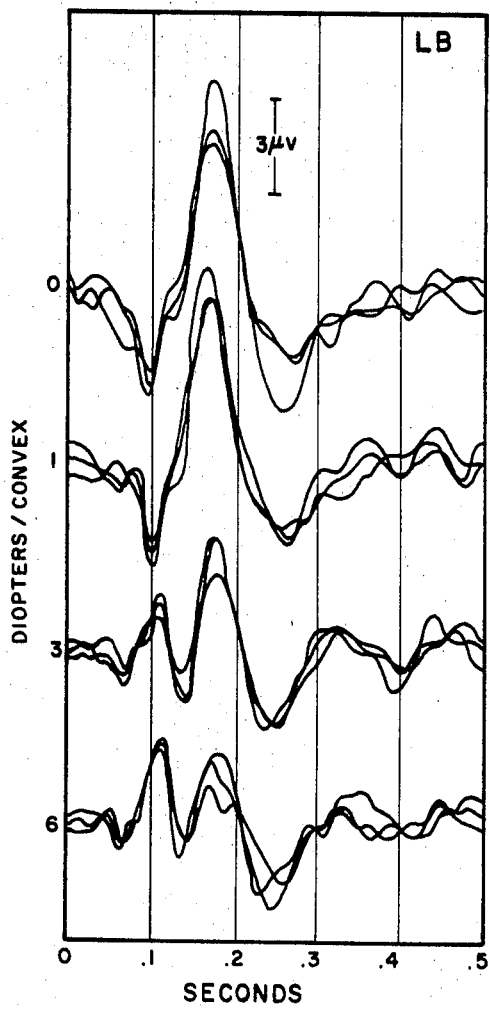
FIG. 6 shows evoked cortical potential patterns obtained when various diopter lenses were placed before a FIGS., subject's eyes.

Referring to the drawing where like reference numerals refer to similar parts throughout the FIGS. there is shown in FIG.. 1 an enclosure or room 10 in which is used the novel apparatus 12 of this invention. Room 10 is preferably electrically shielded because the cortical energy to be measured is in the order of microvolts. Room 10 may be provided with suitable illumination and controls (not shown) so that the enclosure can be darkened and light admitted solely through window 14, although a darkened environment is not required. In the tests that will be hereinafter described each subject, S, to be examined was seated at a position 60 cm. from and aligned with window 14 in a manner similar to that used in any conventional eye examination. Window 14 is covered by a translucent panel 16 on which is supported a transparency of a stimulus 18 to be employed in the particular tests, such as one of the stimuli illustrated in FIG. 3. Stimulus 18 is illuminated by a strobe-lamp 20 (Grass PS-2) positioned outside the room about 1 meter from window 14. In the experiments producing the samples of brain waves illustrated in this patent application, lamp 20 was energized for $10\mu$ sec., once per second, the intensity of the flash being of medium brightness and maintained constant (level 4 on a Grass Photo-Stimulator PS-2). Lamp 20 is connected to a triggering switch 22.

The novel method employed in this invention utilizes the changes in electrical energy created by the brain in reacting to a stimulus, which change is called evoked response or evoked potential. To measure the evoked cortical potential a pair of electrodes are positioned on the subject's cranium, on electrode 24 being supported by a head harness 26 on the midline of the scalp over the occipital cortex, the other electrode 28 serving as a reference or ground and attached to one of the subject's earlobes. As the cortical potential is in the order of approximately 2 or 3 microvolts it is necessary to feed the electrode output by conductors 30 to an electroencephalograph amplifier 32 and then to an average response computer (e.g., the Mnemotron Computer of Average Transients (CAT)) 34. Each time strobe-lamp 20 is fired computer 34 is triggered by switch 22. Computer 34 measures and summates a record of the brain's activity during a given period of time following the onset of stimulation, the total elapsed time period chosen for the tests being 500 msec. Either 50 or 100 responses were summed for each condition tested and a record of each summation is provided by recorder 36.

Amplifier 32, computer 34, and recorder 36 may be installed in a separate room instead of being in the same room, as illustrated.

It has been discovered that pronounced components in the cortical response occur significantly at two elapsed times after initiation of the stimulation in response to changes of focus of the stimuli, one of the components being positive and the other component being negative. When the image of the stimuli presented to the subject is most sharply focused the negative and positive components are of maximum magnitude. The phenomena being investigated in the tests to be described is not the primary cortical evoked response, which occurs relatively soon after the subject is stimulated. Instead, the evoked response concerned with in this invention appears as a rather complex waveform occurring from about 50 and 300 msec. after stimulation. This time interval is of psychological importance as it seems to be that interval taken up by perceptual decision-making, and perhaps short term memory processes. The feeling of many investigators in this field is that this complex evoked pattern is indeed correlated with the information processing activities of the brain.

In order to better understand the nature of the cortical response to sharpness of focus of stimuli a series of tests were conducted using the apparatus illustrated in FIG. 1.

The first test was conducted to obtain the cortical response under only two conditions of sharpness of focus of the stimulus, namely, a "sharp focus" and a "degraded focus." These two conditions were obtained by simply placing a stimulus pattern 18, i.e., the checkerboard stimulus 18a of FIG. 3a in the front of translucent panel 16 for the condition of "sharp focus," and by positioning stimulus 18 in back of panel 16 for the condition of "degraded focus."

The cortical responses of four subjects under conditions of both "sharp focus" and "degraded focus" are illustrated in FIG. 2. The cortical response was measured during the 500 msec. following each stimulus presentation. Records obtained in three replications of each condition, each replication consisting of a summation of 100 responses, were superimposed to show the degree of variability. As is seen in FIG. 2, the degree of variability between replications is quite small, and is insignificant for the objects of this invention.

Comparison of the responses in both conditions of FIG. 2 show that these responses differed in two major aspects. First, at around 100±10 msec. following stimulation (indicated by letter A in FIG. 2), a marked negative component was present when the stimulus was sharply focused. In some subjects (RH and JA), this negative component with the same latency. This negative component was missing or greatly reduced in amplitude when the degraded stimulus was used. Secondly, at around 180±10 msec. following stimulation (indicated by letter B in FIG. 2) there was a positive component whose amplitude was greatly reduced under the "degraded focused" conditions. These results show that the amplitude of the two components of the evoked response referred to as A and B are quite sensitive to changes in the sharpness of focus of the visual patterns and this characteristic forms the basis of the present inventive method for determining the effectiveness of spatial vision.

A follow-on study was then made to determine whether or not different visual patterns would produce different patterns in the evoked waveform and their effect on the locations of components A and B. Four different stimulus patterns were used as shown in FIG. 3, namely, a checkerboard FIG. 3a, a horizontal grating of black and white lines in FIG. 3b, a set of concentric circles as shown in FIG. 3c, and a set of radial lines as in FIG. 3d, each stimulus pattern being on a 20×25 cm. transparency. Each of the four stimulus patterns were presented to the subjects under the "sharp focus" conditions described with reference to FIG. 2.

FIG. 4 shows the resulting cortical responses for each of the four stimulus patterns of FIG. 3 from four subjects. Each condition was replicated four times, and each record represents the summation of 100 responses. The records reveal marked individual differences along with a high degree of reliability of a given subject. Definite differences in response are shown to the different stimulus patterns, the degree of difference again varying with the subjects. The basic similarity of cortical responses from the subjects to the checkerboard stimulation should be noted with the marked negativity at 100 msec. and marked positivity at around 180 msec., as previously observed from FIG. 2. Even though the subjects gave similar responses to the checkerboard stimulus, they gave very different responses to the radial line pattern, which differences are related to different degrees of astigmatism in the subjects. Subject LB is the most astigmatic, and his response to the radial line pattern, 18d, was typical to his responses to blurred images.

From FIG. 4, it appears that the checkerboard stimulus is the most effective type of stimulus for producing the maximum evoked response in tests for near signtedness and for far sightedness. The question arose as to whether or not the evoked responses would discriminate among checkerboard patterns consisting of different sized checks. FIG. 5 shows records obtained wherein check size was the variable. Six different check-sized stimulus patterns were employed, check size No. 1 to No. 6 subtended angles of 120°, 60°, 40°, 20°, 10°, and 5°, respectively. Check size No. 5, in which the elements each subtended 10' of arc visual angle appears to produce the maximum cortical response.

The response evoked by a visual pattern is also dependent on the quality of the retinal image produced by that pattern.

The sensitivity to the varying degrees of image sharpness shown by the evoked responses indicate the feasibility of using this method as a means of determining the refractive error of a person's vision. FIG. 6 shows a simplified record of one subject which is merely illustrative of many records obtained wherein the subject observed a checkerboard pattern under varying conditions of degree of clarity, that is, the focus was varied by means of a graded series of opthalmic lens. Although FIG. 6 illustrates only four convex diopter settings, a full range of convex and concave lens would normally be used. Although four diopter lens are indicated, the zero diopter case was one in which no lenses were utilized, the subject observing the pattern biocularly. In the other conditions lenses of the strengths indicated were placed in a lens holder 38 placed before the S's eyes. In this test there were three replications of each condition, each record representing the summation of 50 responses. The S had sharpest vision on the range between 0 and 1 diopters, and poorest with 6 diopters, where he was scarcely aware of any form in the stimulus. The form of the evoked responses for these conditions is typical of the results obtained in the other tests, namely, the marked negativity at 100 msec., and the high amplitude positivity at about 180 msec., these two being the indicators of stimulation by a sharply focused checkerboard pattern in the normal adult. It is interesting to compare the responses of subject LB in FIG. 6 with those for the same subject LB in FIG. 4. It can be seen that the response in FIG. 6 to the checkerboard stimulus 18a is essentially identical to the sharply focused conditions in FIG. 4. Also notice that LB's response to the radial line pattern 18d is very similar to his badly blurred stimulation in FIG. 6 (6 diopters). As pointed out previously, it is believed that LB's marked astigmatism, which would most affect the radial lines, accounts for this similarity in the evoked responses.

Thus, it can be seen that the degree of astigmatism of the subject can be ascertained by using the typical pattern for this test, namely, FIG. 3b, and rotating it to determine at what angular position, if any, the subject is most astigmatic.

Figure 7:
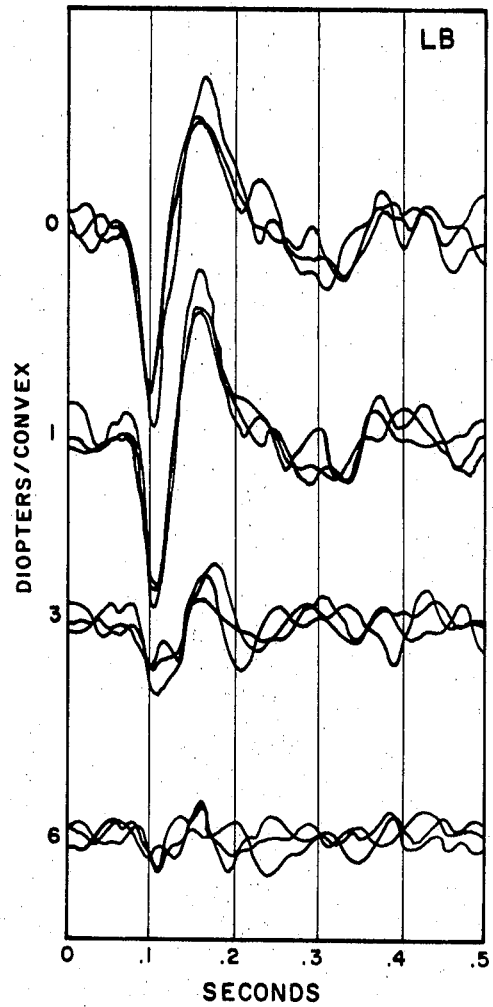
FIG. 7 shows a refined evoked cortical potential pattern of the subject in FIG. 6 achieved by eliminating the effects of all aspects of the total stimulus other than the pattern per se.

FIG. 7 represents a refinement of the technique as shown in FIG. 6. It is assumed that the complex waveform of the cortical response evoked by the checkerboard pattern 18a is a resultant of responses to various aspects of the total stimulus, such as, the intensity and color of the illumination, etc., in addition to the pattern itself. To isolate the contribution made by the contours in the pattern, this may be approximated by removing all traces of the pattern (i.e., placing a −10 diopter lens before the S's eyes) and then subtracting the same number of responses from all the conditions by means of computer 34. The resultant record as shown in FIG. 7 is a good representation of the contribution of solely the contour process. As in FIG. 6, the marked negative component occurs at 100 msec., and the marked positive component occurred at about 150—160 msec. following the onset of stimulation, both magnitudes being slightly greater than in FIG. 6.

Thus, the novel method and apparatus of this invention provides a unique tool to detect vision defects and abnormalities for all subjects, and is particularly useful for those objects that are unable to comprehend and/or communicate, such as very young children. In other words, by means of this invention the subjective approach to eye examinations has been replaced in effect by an objective test not requiring conscientious cooperation by the subject. By relying on the evoked cortical response, the test is more accurate and positive, and should result in a savings of time to both the subject and the person conducting the examination. In this regard, the invention is ideally suitable for clinical use and in elementary schools where it could be used as a screening technique for determining those persons with vision defects that should be referred to an optometrist or an ophthalmologist.

As previously described, the results of the various tests conducted indicate that two significant components, one negative and one positive, of the complex averaged evoked cortical potential are very sensitive to the sharpness of contour of a patterned visual stimulus and to the size of the elements of the pattern.

The two significant components of the cortical response which heretofore have been labeled components A and B may both be utilized in the novel method, although it is believed that component A may be the more reliable indicator so far as sensitivity to diopter settings. Some of the findings indicate that component B may be indicative to some aspects of visual perception other than that reflected by component A, probably related to binocular summation. The type of pattern employed will depend on which characteristic of vision to be studied, i.e., refractive error or astigmatism. In addition, the cortical response may show the subject to have an abnormality of total vision that cannot be corrected by optical means.

Obviously many modifications and variations of the present invention are possible in the light of the above teachings. It is therefore to be understood that within the scope of the appended claims, the invention may be practiced otherwise than as specifically described.

We claim:

1. A method for objectively determining the refractive and astigmatic errors in the spatial vision of a subject including the steps of:
   a. submitting the subject periodically to visual stimuli;
   b. placing a graded series of opthalmic lenses in succession in front of the eyes of the subject;
   c. measuring the evoked cortical responses of said subject to said stimulation for each lens condition; and
   d. comparing the amplitudes of the cortical responses obtained from each of said lenses and determining which lens produces the largest cortical response at a predetermined elapsed time after stimulation thus providing the best optometric correction.

2. The method of claim 1 wherein the step of measuring the peaked responses at the predetermined elapsed time from stimulation occurs at a point of time approximately 100 msec. after stimulation.

3. The method of claim 1 wherein the step of measuring the peaked responses at the predetermined elapsed time from stimulation occurs at a point of time approximately 180 msec. after stimulation.

4. The method of claim 1 wherein said visual stimuli is a pattern of parallel alternative black lines and white lines, and includes the step of rotating said pattern before the subject's eyes for detecting astigmatic error.

5. The method of claim 1 wherein said visual stimuli is a checkerboard pattern for detecting refractive error.

6. A method of objectively determining the refractive and astigmatic errors in the spatial vision of a subject including the steps of:
   a. placing before the subject periodically flashing visual stimuli having sharp contours;
   b. applying a graded series of opthalmic lenses in succession in front of the eyes of the subject;
   c. recording the evoked cortical responses of said subject to said stimulation for each lens condition; and
   d. correlating the cortical responses obtained from each of said lenses and determining which lens produces the largest cortical responses at two predetermined elapsed times after stimulation thus providing the best optometric correction.

7. A method for objectively determining the refractive and astigmatic errors in the spatial vision of a subject including the steps of:
   a. placing before the subject periodically flashing stimuli having a pattern with sharp contours in a first series of stimulations;
   b. applying a graded series of opthalmic lenses in succession in front of the eyes of the subject;
   c. recording the evoked cortical responses of said subject to said stimulation for each lens condition;
   d. submitting the subject to said stimuli in a second series of stimulations in which all traces of the pattern have been removed;
   e. recording the evoked cortical responses of said subject during the second series of stimulation;

f. subtracting by means of a computer the measurements of the second series from the measurements obtained by the first series to eliminate certain aspects of the total stimulus whereby the remaining cortical response measurement is directly related to the sharpness of focus of said stimuli; and g. comparing the remaining cortical responses obtained for each of said lens condition and determining which lens produces the largest cortical response at a predetermined elapsed time after stimulation thus providing the best optometric correction.

8. Apparatus for objectively determining the refractive and astigmatic errors in the spatial vision of a subject the combination comprising:

visual stimuli having a contoured pattern;

means for periodically submitting the stimuli before the eyes of the subjects;

means for placing in front of the subject's eyes in succession a graded series of opthalmic lenses for varying the sharpness of focus of the images of said stimuli on a subject's retina;

electrode means adapted to be positioned at selected areas on the subject's cranium for measuring the cortical potential responses to each stimulation; and means for measuring and comparing the amplitudes of the cortical responses obtained from each of said lenses whereby it can be determined that the lens producing the largest cortical response at a predetermined elapsed time after stimulation provides the best optometric correction.

9. The apparatus of claim 8 wherein said stimuli is a checkerboard configuration.

10. The apparatus of claim 9 wherein the elements of said checkerboard pattern subtend about 10'—15' of arc measured from the subject.

11. The apparatus of claim 8 wherein said comparing means includes an average response type computer for summating a plurality of the cortical responses for each lens condition; and means for recording waveform outputs from said computer.

12. The apparatus of claim 11 wherein:

a. the subject is positioned in a darkened, electrically shielded room; and b. a flashing lamp for periodically illuminating the stimuli to be visible by the subject.

13. The apparatus of claim 12 wherein a switch is provided as a trigger in a circuit with said lamp to initiate operation of said computer whenever the stimuli is illuminated.